United States Patent
Redlich

(10) Patent No.: US 6,266,968 B1
(45) Date of Patent: Jul. 31, 2001

(54) MULTIPLE EVAPORATOR REFRIGERATOR WITH EXPANSION VALVE

(76) Inventor: Robert Walter Redlich, 9 Grand Park Blvd., Athens, OH (US) 45701

( * ) Notice: Subject to any disclaimer, the term of this patent is extended or adjusted under 35 U.S.C. 154(b) by 0 days.

(21) Appl. No.: 09/616,552

(22) Filed: Jul. 14, 2000

(51) Int. Cl.⁷ .................................................. F25B 41/04
(52) U.S. Cl. .............................. 62/204; 62/179; 62/225; 62/526
(58) Field of Search .............................. 62/204, 203, 210, 62/211, 212, 222, 223, 224, 225, 179, 180, 186, 198, 441, 447, 524, 525, 526, 229

(56) References Cited

U.S. PATENT DOCUMENTS

| | | | |
|---|---|---|---|
| 2,026,838 | * 1/1936 | Koepke | 62/526 X |
| 2,133,959 | * 10/1938 | Buchanan | 62/526 X |
| 2,515,825 | * 7/1950 | Grant | 62/198 X |
| 4,459,819 | 7/1984 | Hargraves . | |
| 5,150,583 | * 9/1992 | Jaster et al. | 62/179 |
| 5,406,805 | 4/1995 | Rademacher et al. . | |

* cited by examiner

Primary Examiner—Harry B. Tanner
(74) Attorney, Agent, or Firm—Debra A. Bright; Kremblas, Foster, Phillips & Pollick

(57) ABSTRACT

A refrigerator that efficiently cools multiple cold spaces at different temperatures with one compressor and one condenser is disclosed. Multiple, fan equipped evaporators are in series, and an expansion valve regulates superheat from inlet to outlet of the series evaporators. Cold space temperatures are regulated with an on-off thermostat in each space. If only one fan is turned on, system performance approaches that of a single evaporator refrigerator with controlled superheat. More than one evaporator fan may be turned on for initial cooldown.

3 Claims, 3 Drawing Sheets

MULTIPLE EVAPORATOR REFRIGERATOR WITH EXPANSION VALVE

REFERENCES

1. U.S. Pat. No. 5,406,805
2. U.S. Pat. No. 4,459,819

TECHNICAL FIELD

The invention is in the field of vapor compression refrigeration. It is a refrigerator that will efficiently cool multiple cold spaces using only one compressor and one condenser, each cold space being cooled to and maintained at a temperature that can be set by the user.

BACKGROUND ART

The present invention fundamentally improves a refrigerator described in Ref. 1, which uses one compressor, one condenser, and separate thermally insulated freezer and fresh food compartments, each with its own evaporator. As described in Ref. 1, two evaporators are in series, and each is equipped with a fan, which, if not energized, greatly reduces heat transfer to its associated evaporator. Thus, the evaporators may be individually "activated" by energizing one fan and turning off the other. The method disclosed in Ref. 1 advantageously uses a transient effect that occurs in any vapor compression refrigerator in which the refrigerant charge, the bulk of which is in the condenser at high pressure while the compressor is running, is allowed to flow into the low pressure evaporator while the compressor is stopped. The result of such migration of refrigerant is warming of the evaporator, and when the compressor restarts, there is a transient time interval, typically two or three minutes, when the evaporator and the refrigerant it contains are too warm to efficiently cool the cold space. According to Ref. 1, the evaporator of the fresh food evaporator is activated and that of the freezer de-activated during the transient time interval. Since the fresh food compartment is typically about 35F warmer than the freezer, it can be cooled efficiently during the transient time interval.

BRIEF DESCRIPTION OF THE INVENTION

As in prior art Ref. 1, the invention uses one compressor, one condenser, and more than one evaporator, each evaporator being equipped with a fan. However, the present invention does not use the transient effect that, as previously described, is the basis for the method of Ref. 1. Indeed, the transient effect method of Ref. 1 is purposefully prevented in the present invention in order to reduce stop-start loss, by blocking charge migration from condenser to evaporator during compressor-off periods. The present invention uses multiple series evaporators and an expansion valve responsive to superheat measured from the series evaporator inlet to its outlet. The expansion valve automatically adjusts refrigerant flow to match heat transfer from the active evaporator, thus maximizing efficiency regardless of which evaporator is active, and at any condenser pressure within normal limits. Although Ref. 1 refers to an expansion valve (pg. 3, line 50–51, pg. 4, line 25, claims 7 and 13) as an optional alternative to a capillary tube, such references are, in each case, to application of an expansion valve in a multiple evaporator refrigerator based on the transient effect previously described. In the present invention, the transient effect is deliberately avoided to reduce stop-start loss.

If the expansion valve shuts during compressor-off periods, stop-start losses due to charge migration are reduced but pressure equalization of condenser and evaporator pressures is prevented, which may, at ambient temperatures above a certain temperature, cause the compressor motor to overload during restart because of high discharge pressure. To reduce stop-start loss but avoid motor overload, an expansion valve according to the invention may be controlled so that, during compressor-off periods, it shuts only at ambient temperatures low enough to allow the compressor motor to restart without overload.

The number of fan activated series evaporators according to the invention is not limited to two, but may be any integer equal to or greater than two.

According to the invention, the fans that activate each of the multiple evaporators may be controlled so that a particular evaporator fan is only energized if the temperature of the chamber in which it is located is higher than both a set point temperature and the temperature of the series evaporator, thus ensuring that colder compartments are not warmed during refrigeration of warmer 4 compartments.

According to the invention, the compressor motor may be controlled so that it is only energized when at least one evaporator fan is energized.

BRIEF DESCRIPTION OF THE DRAWINGS

FIG. 4 also illustrates two waveforms of voltages generated by the expansion valve control.

DETAILED DESCRIPTION OF THE INVENTION

Although the block diagram (FIG. 1) shows three evaporators in series, it is not intended to restrict the number of evaporators, which number can be any integer equal to or greater than two.

The invention uses prior art vapor compression refrigeration, which is common in a variety of applications, and is a closed loop system comprising the basic steps; a) compress refrigerant vapor, b) cool the compressed vapor in a condenser, where it liquefies, c) force pressurized liquid refrigerant through a restriction such as a capillary tube or expansion valve, from which the refrigerant emerges as cold, low pressure, mixed liquid and vapor, d) pass the cold, low pressure refrigerant through an evaporator, where heat transferred to the refrigerant from the space to be cooled vaporizes its liquid component so that refrigerant vapor leaves the evaporator and goes to the compressor through a suction line to close the loop and repeat the refrigeration cycle.

Figure 1:
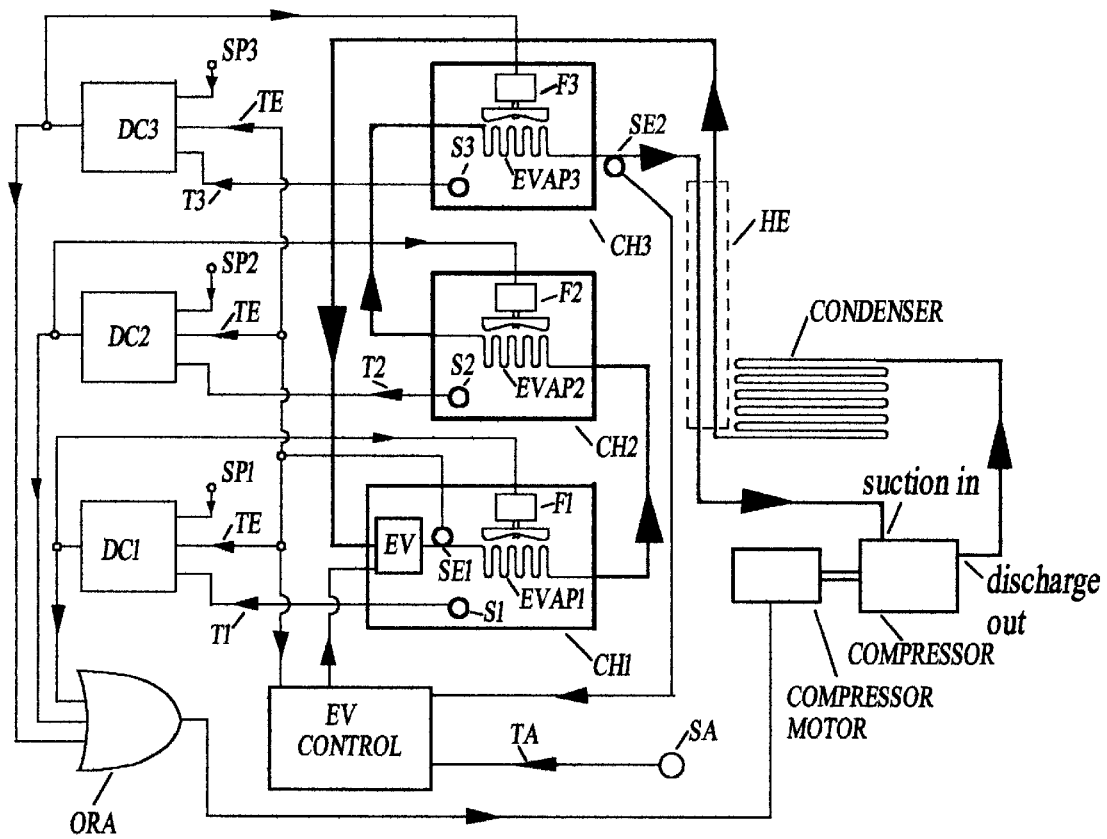
FIG. 1 is a schematic diagram of a preferred embodiment of the invention for the particular case of;
 a) three series evaporators,
 b) an electronically controlled expansion valve (EV),
 c) each evaporator fan only energized if the temperature of its associated cold chamber exceeds both a set point temperature and evaporator temperature, and
 d) compressor runs only if at least one evaporator fan is energized.

The vapor compression refrigeration loop of the invention is indicated in FIG. 1 by heavier line weight and larger arrows than control signal paths. The loop consists of one compressor, one condenser, one expansion valve (EV), and three evaporators (EVAP 1, EVAP2, EVAP3) in series. The three evaporators cool respective thermally insulated chambers (CH1, CH2, CH3) to temperatures determined by set-point signals (SP1, SP2, SP3) which may be either preset or user adjustable. As in prior art, a heat exchanger HE transfers heat from warm liquid leaving the condenser to cold suction vapor in order to cool the liquid, which increases the system's refrigeration capacity. As in prior art Reference 1, EVAP1, EVAP2, and EVAP3 are equipped with electrically driven fans F1,F2, and F3, that greatly enhance heat transfer to their respective evaporators. Heat transfer to any evaporator whose associated fan is turned off is relatively so poor that it acts functionally as a passage that transfers little heat to or from the refrigerant flowing through it. Thus, any evaporator can be "activated", i.e., caused to transfer heat effectively, by energizing its associated fan and de-activated by turning off its fan. If only one evaporator is activated, the system functions essentially as a single evaporator refrigerator.

The invention departs from prior art by using an expansion valve EV which responds to superheat in the entire chain of series evaporators, i.e., to the difference between the temperature at the inlet to EVAP1 and the temperature at the outlet of the last evaporator in the series chain, in this case EVAP3. Temperatures at the inlet to EVAP1 and at the outlet of EVAP3 are sensed by temperature sensors SE1 and SE2. Temperature signals from SE1 and SE2 are inputs to EV CONTROL, which causes expansion valve EV to respond by increasing or decreasing refrigerant flow if superheat respectively exceeds or is less than a preset value. Such response constitutes negative feedback and acts to maintain superheat at or near the preset value, which is typically in the range 3–8° C. Low superheat maximizes efficiency in two ways. First, it ensures complete vaporization within the series evaporator, so that all the heat of vaporization of liquid refrigerant is productively used to cool the cold chambers. Secondly, it ensures maximum evaporator temperature consistent with the heat load on the evaporators, which minimizes compressor work per unit of heat energy removed from the cold chambers.

From the foregoing, it is evident that, if only one evaporator is activated in a system according to the invention, the system functions essentially as if it had a single evaporator in which superheat is controlled to a low preset value. Efficiency during cooling of any cold chamber is therefore nearly maximized, at any ambient temperature and any cold chamber temperature within normal limits.

Hereafter, components and signals will be referred to in index notation, e.g., CHn, Tn, where n=1,2,3.

Cold chamber CHn requires refrigeration when its temperature rises above a set point temperature determined by the set point signal SPn. If more than one chamber required cooling and the evaporators for those chambers were simultaneously activated, the active evaporators would assume a common temperature that may be above one or more of the set-point temperatures, and those chambers whose set-point temperatures were below the common evaporator temperature would be warmed instead of cooled. The invention avoids this by only energizing fan Fn if both of the following two conditions are met during compressor-on intervals;

a) the temperature of CHn is above its set point temperature.

b) the temperature of CHn is above the common evaporator temperature.

Figure 2:
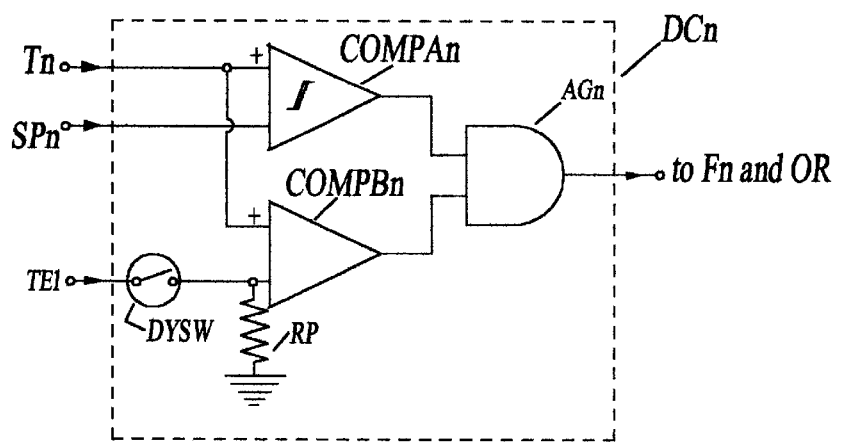
FIG. 2 is a block diagram of a dual comparator control element used to energize an evaporator fan if the temperature of its associated cold chamber exceeds both a set point temperature and evaporator temperature.

Conditions a) and b), above, are enforced in a preferred embodiment of the invention by dual comparators DCn as shown in FIG. 1. A logic diagram of one such dual comparator is shown in FIG. 2. COMPAn is a comparator with hysteresis that compares chamber temperature signal Tn with set point temperature SPn and goes to high logic level if chamber temperature exceeds set point temperature by an incremental temperature $\Delta T$ determined by the hysteresis in COMPAn. COMPBn compares Tn with an evaporator temperature signal TE, and goes high if chamber temperature exceeds evaporator temperature. To allow TE to reach equilibrium before it is compared with Tn, a time delay, typically 2 minutes, is initiated in delay switch DYSW at compressor start. Prior to initiation of the delay, DYSW is open, the output of COMPBn is held at a high logic level by pulldown resistor RP, and both Fn and ORA are controlled solely by COMPAn After the delay interval, delay switch DYSW closes, TE is applied to COMPBn, and AND gate A drives the output of DCn high only if the outputs of COMPAn and COMPBn are both high. When the output of the AND gate is high, Fn is energized. If one or more outputs of dual comparators DCn are high, OR gate ORA shown in FIG. 1 causes the compressor motor to be energized.

Figure 3:
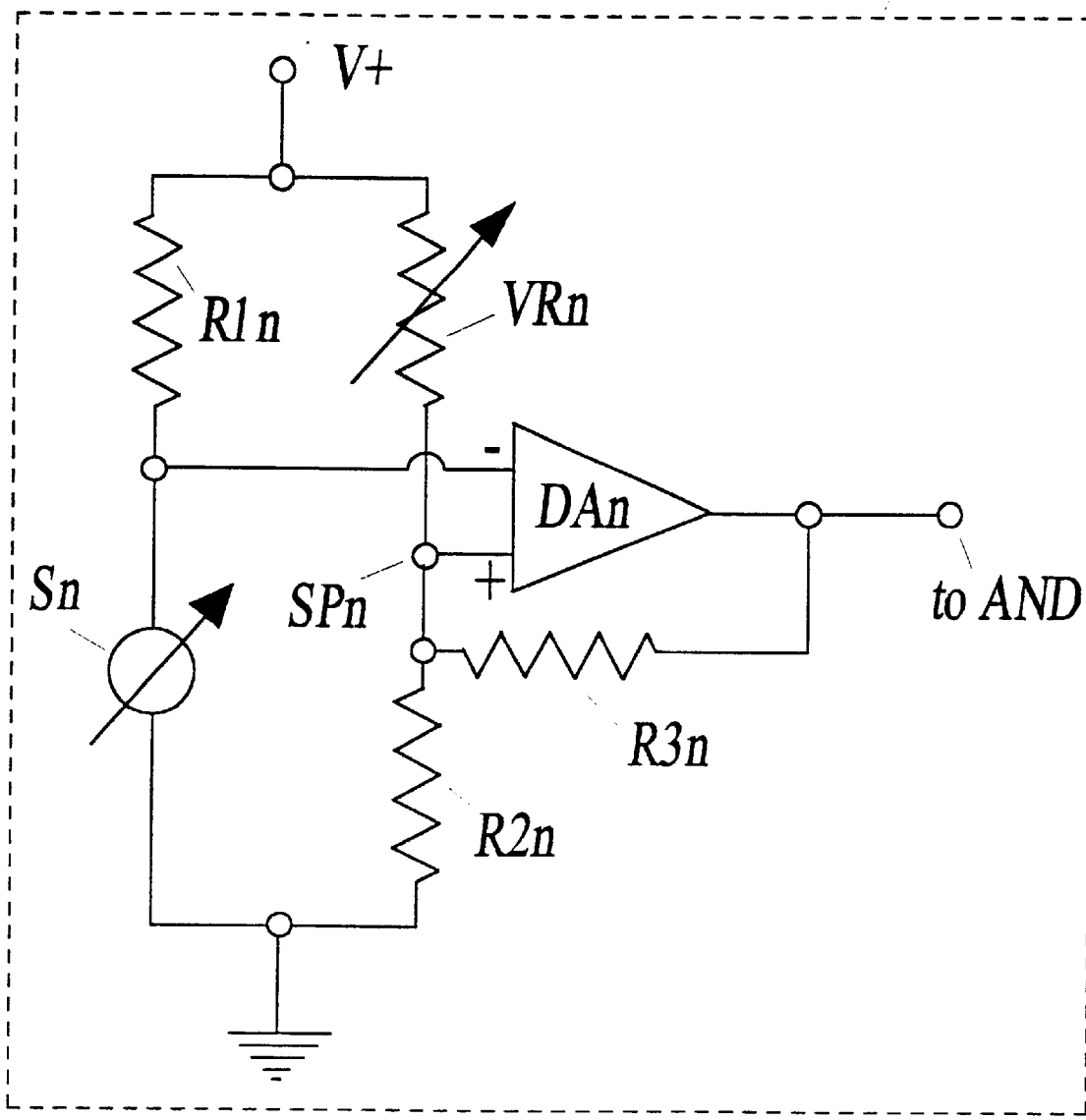
FIG. 3 is a circuit diagram of a comparator with hysteresis, which is one of the elements of FIG. 2.

FIG. 3 is a circuit diagram of an embodiment of COMPAn, in which temperature sensor Sn is a negative temperature coefficient thermistor located in CHn, and temperature set point SPn can be adjusted with variable resistor VRn. The output of high gain difference amplifier DAn changes from a low to a high logic state when the difference between the voltage at its plus input terminal and the voltage at its minus input terminal transitions from negative to positive. Transitions will occur when;

$$\text{temperature of CHn} = [(\text{temperature set point})n + / - \Delta Tn)],$$

where $\Delta Tn$ is a temperature band determined by values of R2n and R3n, and (temperature set point)n is determined by R1n, R2n, the setting of VRn, and the resistance of Sn as a function of temperature.

Although the invention can use a thermostatic expansion valve as described in Reference 2 (pg. 1, lines 40–68), a preferred embodiment as shown in FIG. 1 uses pulse width control of an expansion valve, which is well known in prior art, and is described in Reference 2. Briefly, pulse width control uses an orifice in series with a valve that is either fully open or fully closed. The valve is pulsed open at constant frequency, and is held open for a controllable time. The average flow rate of refrigerant is proportional to the time the valve is held open.

Figure 4:
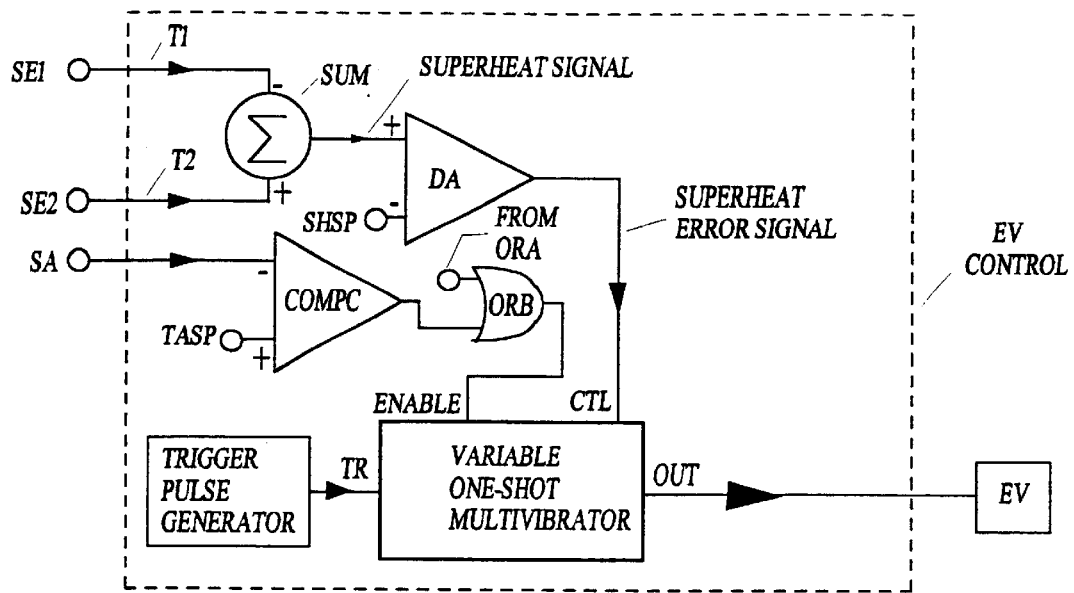
FIG. 4 is a block diagram of the control for a pulse width modulated electronic expansion valve.
Figure 4:
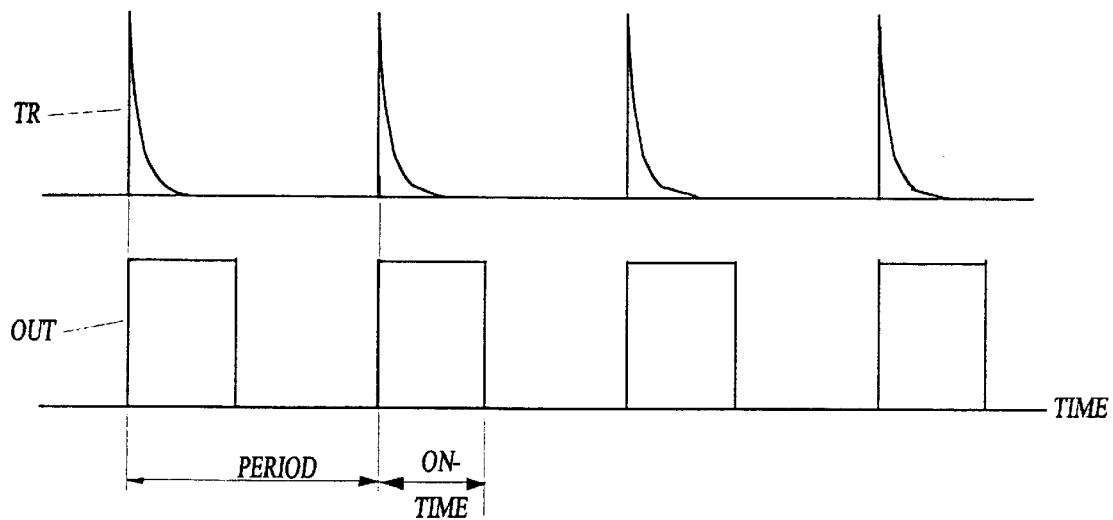

FIG. 4 is a block diagram of a preferred embodiment of a pulse width EV CONTROL, which opens expansion valve EV periodically and increases the ratio [on-time/period] as superheat increases. The term "on-time", defined as the time EV is held open, refers to FIG. 4 of the present specification and to FIG. 5 of Reference 2. Temperature sensors SE1 and SE2 provide temperature signal inputs T1 and T2 to the EV CONTROL. The difference between SUPERHEAT SIGNAL (T2–T1) and superheat setpoint SHSP is amplified by difference amplifier DA to generate a control signal which is applied to control terminal CTL of a VARIABLE ONE-SHOT MULTIVIBRATOR. A TRIGGER PULSE GENERATOR periodically initiates voltage pulses at the OUT terminal of the multivibrator, and the duration of the pulses at the OUT terminal increases with increased voltage at CTL. Pulses from the OUT terminal are applied to expansion valve EV and cause it to open.

In the preferred embodiment of FIG. 1, temperature sensor SE1, in addition to providing one input signal to the EV CONTROL, also provides an evaporator temperature input TE to dual comparator DCn for control of fan Fn and the compressor motor, as previously described.

The EV CONTROL also reduces stop-start loss while still avoiding motor overload at compressor restart by shutting expansion valve EV during compressor-off periods to prevent charge migration (which causes a stop-start loss), but only doing so at ambient temperatures below that at which motor overload would occur if evaporator and condenser pressures were not allowed to equalize. In FIG. 4, SA is an ambient temperature sensor and TASP is an ambient temperature set point signal. TASP is adjusted so that the output of comparator COMPC goes to a high logic level if ambient temperature equals or exceeds the minimum value at which compressor motor overload would occur if condenser and evaporator pressures were not allowed to equalize. The output of COMPC is one input to OR gate ORB. A second input to ORB is the output of OR gate ORA (FIG. 1), which output goes to a high logic level if the compressor motor is energized. The output of ORB goes to a high logic level and enables the ONE-SHOT MULTIVIBRATOR that applies pulses to open expansion valve EV if either the compressor motor is energized or if ambient temperature exceeds that at which pressure equalization is required. Thus, when the compressor motor is turned off, EV will shut if pressure equalization in unnecessary but will continue pulsing if pressure equalization is needed to avoid motor overload at restart.

If evaporator temperature is above freezing when a particular cold chamber CHj is being refrigerated, the other chambers will be defrosted during refrigeration of CHj.

What is claimed is:

1. In a vapor compression refrigeration system that includes, a compressor with a suction inlet and a discharge outlet, the compressor powered by a compressor motor, a condenser having an inlet and an outlet, the condenser inlet receiving compressed refrigerant vapor from the discharge outlet of the compressor, the following combination is claimed, a) two or more thermally insulated chambers, the chambers designated here by CHn, where n herein is an index number suffix in the range n=1,2,3———N, N≧2, CHn containing an evaporator designated here by EVAPn, EVAPn equipped with an electrically driven fan designated here by Fn which, when energized, moves air over the surface of EVAPn to enhance heat transfer from EVAPn, the outlet of EVAPn connected by a refrigerant passage to the inlet of EVAP(n+1) for n<N. the outlet of EVAPN connected by a refrigerant passage to the suction inlet of the compressor, b) an expansion valve with an inlet connected by a refrigerant passage to the condenser outlet and an outlet connected by a refrigerant passage to the inlet of EVAP1, b) an expansion valve control, responsive to the difference in temperature between the outlet of EVAPN and the inlet of EVAP1, the expansion valve control causing the expansion valve to respectively increase or decrease refrigerant flow if said difference in temperature exceeds or is below a preset temperature difference.

2. A refrigeration system according to claim 1, including also, a temperature sensor Sn within CHn, Sn generating a signal Tn responsive to the temperature of the interior of CHn, an evaporator temperature sensor SE, SE generating a signal TE responsive to evaporator temperature a time delay switch DYSW with first and second terminals, signal TE connected to the first terminal, the first terminal being disconnected from the second terminal when the compressor is not running, connection between the first and second terminals being made during a time interval beginning from one to five minutes after the compressor starts and continuing until the compressor stops running, user adjustable temperature set point signals SPn, dual comparators DCn, each of DCn having first, second and third inputs, the first input being chamber temperature signal Tn, the second input being chamber setpoint signal SPn, the third input being signal from said second terminal of time delay switch DYSW, the output of DCn causing fan Fn to be energized only if Tn is both a) greater than SPn by a preset increment ΔTn and b) greater than the signal at said third input, the output of DCn causing fan Fn to be turned off if Tn is less than SPn by a preset increment ΔTn, an N input OR gate whose inputs are the outputs of DCn and whose output causes the compressor motor to be energized.

3. A refrigerator according to claim 1 in which said expansion valve is a pulse width controlled expansion valve.

* * * * *